(12) United States Patent
Malshe et al.

(10) Patent No.: US 9,649,746 B2
(45) Date of Patent: May 16, 2017

(54) COATING LAYER WITH MICROSTRUCTURE SERRATED EDGE

(75) Inventors: Ajay P. Malshe, Springdale, AR (US); Wenping Jiang, Fayetteville, AR (US)

(73) Assignee: NanoMech, Inc., Springdale, AR (US)

( * ) Notice: Subject to any disclaimer, the term of this patent is extended or adjusted under 35 U.S.C. 154(b) by 420 days.

(21) Appl. No.: 14/119,785

(22) PCT Filed: May 29, 2012

(86) PCT No.: PCT/US2012/039890
§ 371 (c)(1),
(2), (4) Date: Mar. 21, 2014

(87) PCT Pub. No.: WO2012/166744
PCT Pub. Date: Dec. 6, 2012

(65) Prior Publication Data
US 2014/0212232 A1 Jul. 31, 2014

Related U.S. Application Data

(60) Provisional application No. 61/490,730, filed on May 27, 2011, provisional application No. 61/490,719, filed on May 27, 2011.

(51) Int. Cl.
*B23B 27/14* (2006.01)
*B24D 3/06* (2006.01)
(Continued)

(52) U.S. Cl.
CPC ............. *B24D 3/06* (2013.01); *B23B 27/141* (2013.01); *B23B 27/143* (2013.01); *B23B 27/148* (2013.01); *B24D 18/0009* (2013.01);
*C04B 35/5831* (2013.01); *C23C 28/044* (2013.01); *C23C 30/005* (2013.01); *B23B 2200/081* (2013.01); *B23B 2200/087* (2013.01);
(Continued)

(58) Field of Classification Search
USPC .......... 51/307, 309; 428/325, 336, 697, 698, 428/699
See application file for complete search history.

(56) References Cited

U.S. PATENT DOCUMENTS 3,574,911 A   4/1971   Penoyar
4,285,618 A   8/1981   Shanley, Jr.
(Continued)

FOREIGN PATENT DOCUMENTS

JP   2002-307129   * 10/2002

OTHER PUBLICATIONS

Wenping Jiang et al., "Cubic Boron Nitride (cBN) based nanocomposite coatings on cutting inserts with chip breakers for hard turning applications," Surface and Coatings Technology, Elsevier, Amsterdam, NL, vol. 200, No. 5-6, pp. 1849-1854 (Nov. 2005).

(Continued)

*Primary Examiner* — Archene Turner

(57) ABSTRACT

A cutting tool formed by a coating layer on a substrate has cutting edges that feature serrations. The linear dimensions of the serrations may vary from a few nanometers up to 10 microns. The serrations result in a smoother cut edge on the workpiece, particularly when the workpiece is formed of certain materials that are seen as particularly difficult to cut, such as hardened steels.

8 Claims, 2 Drawing Sheets

(51) Int. Cl.
  *C23C 30/00* (2006.01)
  *C23C 28/04* (2006.01)
  *B24D 18/00* (2006.01)
  *C04B 35/5831* (2006.01)

(52) U.S. Cl.
  CPC ... *B23B 2200/204* (2013.01); *B23B 2200/205* (2013.01); *B23B 2228/10* (2013.01); *C04B 2235/3217* (2013.01); *C04B 2235/3843* (2013.01); *C04B 2235/3856* (2013.01); *C04B 2235/3886* (2013.01); *C04B 2235/604* (2013.01); *C04B 2235/614* (2013.01); *C04B 2235/665* (2013.01); *C04B 2235/667* (2013.01); *Y10T 407/24* (2015.01); *Y10T 407/27* (2015.01); *Y10T 428/265* (2015.01)

(56) References Cited

U.S. PATENT DOCUMENTS

| | | | |
|---|---|---|---|
| 4,681,486 A | 7/1987 | Hale | |
| 4,714,660 A * | 12/1987 | Gates, Jr. | B24D 3/001 |
| | | | 428/698 |
| 4,794,665 A | 1/1989 | Peters | |
| 4,844,322 A | 7/1989 | Flowers et al. | |
| 4,867,616 A | 9/1989 | Jakubowicz | |
| 5,182,238 A * | 1/1993 | Holleck | C23C 14/0635 |
| | | | 428/698 |
| 5,288,186 A | 2/1994 | Kovacevic | |
| 6,053,669 A * | 4/2000 | Lagerberg | B23B 27/10 |
| | | | 407/119 |
| 6,161,990 A | 12/2000 | Oles et al. | |
| 6,796,751 B2 | 9/2004 | Flolo | |
| 6,899,494 B2 | 5/2005 | Walrath | |
| 7,008,145 B2 | 3/2006 | Astrakhan | |
| 7,275,896 B2 | 10/2007 | Nudelman | |
| 7,503,162 B2 | 3/2009 | Herlyn et al. | |
| 7,510,760 B2 | 3/2009 | Malshe et al. | |
| 7,588,396 B2 | 9/2009 | Flynn | |
| 7,591,614 B2 | 9/2009 | Craig | |
| 7,632,278 B2 | 12/2009 | Jansen et al. | |
| 7,637,700 B2 | 12/2009 | Nishio et al. | |
| 2003/0022026 A1 | 1/2003 | Malshe et al. | |
| 2003/0087749 A1 * | 5/2003 | Malshe | C04B 35/5626 |
| | | | 428/698 |
| 2004/0209551 A1 | 10/2004 | Suzuki | |
| 2005/0193564 A1 | 9/2005 | Trbovich, Jr. | |
| 2009/0252566 A1 | 10/2009 | Minshall | |

OTHER PUBLICATIONS

Extended Search Report for EPO Patent App. No. 12792655.8 (Jul. 1, 2015).

* cited by examiner

COATING LAYER WITH MICROSTRUCTURE SERRATED EDGE

CROSS-REFERENCE TO RELATED APPLICATIONS

This application claims priority from U.S. provisional patent application No. 61/490,730, filed May 27, 2011, and entitled "Multiple-Layer Coating and/or Film Configuration Consisting of Cubic Boron Nitride (cBN) Particles"; and U.S. provisional patent application No. 61/490,719, also filed May 27, 2011, and entitled "Fabrication Process for Thick Cubic Boron Nitride (cBN) and Other Ceramic Based Coating and Film." Such applications are incorporated by reference as if set forth fully herein.

STATEMENT REGARDING FEDERALLY SPONSORED RESEARCH OR DEVELOPMENT

Not applicable.

BACKGROUND OF THE INVENTION

Coatings are effective for improving the performance of various materials, such as for achieving better wear resistance and corrosion resistance. Common applications where a coating is applied to a substrate to improve wear resistance of the substrate material include cutting tool inserts for the cutting of hard materials, such as hardened steels. Common substrate materials for cutting tools may include, for example, hard metals formed of different particle sizes, with a varied percentage of cobalt or nickel as a binder material.

It is often desirable to produce a cut or formed material that has a relatively smooth cut edge. It has generally been believed that in order to produce the smoothest cut edge on a workpiece, the cutting tool insert should have a smooth cutting edge surface, preferably a polished smooth cutting edge surface. In the case where the cutting tool insert has a coating of a hard or superhard material applied to a substrate, it has been believed that it is desirable to produce a smooth or polished edge surface on this coating. Serrated edges on cutting tools or cutting tool inserts have been generally believed to result in a rougher surface finish on the workpiece. For these reasons, it has generally been believed that the coating on a coated-substrate cutting tool insert should be applied in as smooth and even a process as possible, so that the cut resulting from the use of such cutting insert will be desirably smooth. It has further been seen as desirable to provide an additional polishing step at the cutting edge of the coating after the coating deposition process is completed, in order to provide an even smoother edge for cutting, thereby resulting in an even more smoothly cut workpiece.

While smoothly polished cutting edges are generally seen as desirable, the art does include attempts to produce cutting tools with serrated cutting edges. These are primarily intended for use in non-metallic cutting applications. In some cases, however, serrated cutting edges have been employed on tool inserts for metal-cutting applications, although as noted above, this is generally seen as a compromise of poorer (rougher) surface finish in favor of higher metal removal rates. U.S. Pat. No. 7,591,614 to Craig provides one such example of a cutting tool insert with serrations. In such cases, however, the cutting tools or cutting tool inserts have a cutting edge that has precisely designed and manufactured serrations, which as a result of their precise configuration lie in periodic patterns. The application of these periodic patterns of serrations in the manufacture of the cutting tool or cutting tool insert is time consuming, thereby increasing the cost of a cutting tool or cutting tool insert produced in this manner. Cutting tools and cutting tool inserts that provide a smooth cut—particularly with very hard materials such as hardened steels—yet which may be produced relatively quickly and therefore inexpensively, are highly desired.

BRIEF SUMMARY OF THE INVENTION

The present invention is directed to a coating on a substrate, such as but not limited for use as a cutting tool insert, where the cutting edge of the surface of the coating comprises serrations or texturing that are arranged aperiodically. Such aperiodic serrations may, for example, be produced by a hybrid process that results in a statistically random pattern of protrusions and troughs, or valleys. Contrary to the teaching of the prior art, the inventors hereof have discovered that this type of cutting edge results in a particularly smooth cut. This is particularly valuable when used for a cutting tool or cutting tool insert that is to be employed in the cutting of very hard materials, such as hardened steels. In various embodiments, the aperiodicity may be at multiple orders or scales, and aperiodicity in one dimension, order, or scale may be combined with periodicity in another dimension, order, or scale.

In a first aspect, the invention is directed to a cutting tool comprising a substrate and a coating on the substrate, wherein the coating comprises at least one cutting edge, and further wherein the at least one cutting edge comprises a plurality of aperiodic serrations.

In a second aspect, the invention is directed to a method for producing a cutting tool, comprising the method steps of depositing a first material to the substrate to produce a coating on the substrate using an electrostatic spray coating (ESC) technique, and infiltrating the coating on the substrate with a second material or second groups of materials using a chemical vapor infiltration (CVI) technique, wherein a coated substrate is produced that comprises a cutting edge, wherein the cutting edge comprises a plurality of aperiodic serrations.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

This invention, according to a preferred embodiment, relates to a substrate with a coating, wherein the coating surface has serrations that appear along its cutting edges and other surfaces. The serrations appear along the cutting edges and other surfaces of the coated substrate in a statistically random distribution, and comprise irregular features consisting of protrusions and troughs (valleys) with linear dimensions in the range of sub-micron features to features with a dimension of a few microns in any direction. In preferred embodiments, the linear dimension in any direction is about 1 to 3 microns. The inventors have found that, contrary to the teaching of the prior art, the inclusion of serrations on the cutting edges and other surfaces of a coated substrate in this size range, when employed for the purpose of a cutting tool or cutting tool insert, results in a cut edge on a workpiece that is particularly smooth. In fact, it has been found that this cut edge on the workpiece can even be smoother than the cut edge that results from use of a traditional cutting tool or cutting tool insert with a smooth, highly polished edge. This is especially true with a workpiece formed of a material that is particularly difficult to cut, such as various hardened steels. The serrations may also function as chipbreakers, which is a feature of cutting tools intended to prevent chips from forming into long pieces. Because a smooth, polished cutting edge is not required or even desired, a cutting tool or cutting tool insert according to the preferred embodiment of the present invention may be produced more quickly and inexpensively than the inferior prior art cutting tools with highly polished cutting edges.

By allowing for such aperiodic serrations on the coating, the coating may be produced without the need of additional post polishing process, and thus at a lower cost for production of the cutting tool insert, because the coating may be applied more quickly (smoothness being unimportant in this case). This approach is quicker and therefore a lower-cost approach when compared with the production of both tools having smooth cutting edges and tools that have purposefully manufactured, periodic serrations. In addition, a cutting tool produced according to the preferred embodiment of the present invention does not require any polishing step after deposition. In fact, it is believed that polishing or other efforts to smooth the cutting edge after the coating has been deposited would in fact be counterproductive to the desired result of a smooth cut edge on the workpiece. Thus the smoothing step may be eliminated entirely, further reducing the time of production and thus the cost associated with producing the cutting tool or cutting tool insert.

Figure 1:
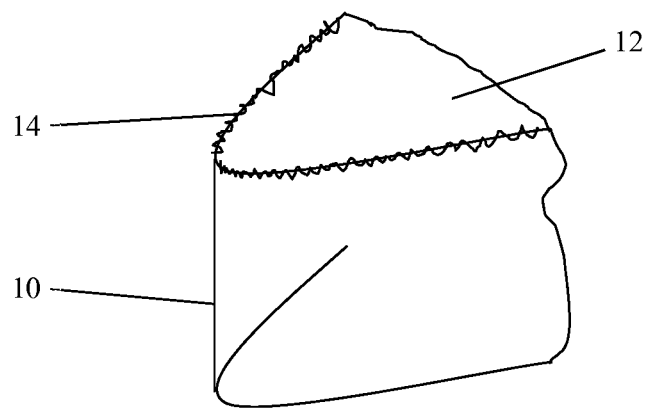
FIG. 1 is a perspective view drawing of a substrate and coating with aperiodic serrations at a cutting edge, according to a preferred embodiment of the present invention.
Figure 2:
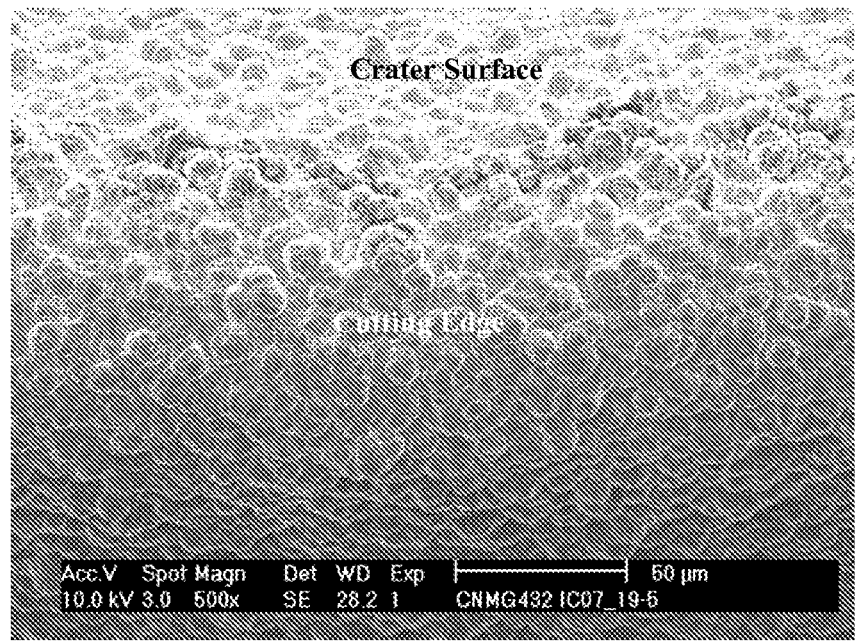
FIG. 2 is a close-up SEM micrograph of the cutting edge of a substrate coating with aperiodic serrations, according to a preferred embodiment of the present invention.
Figure 4:
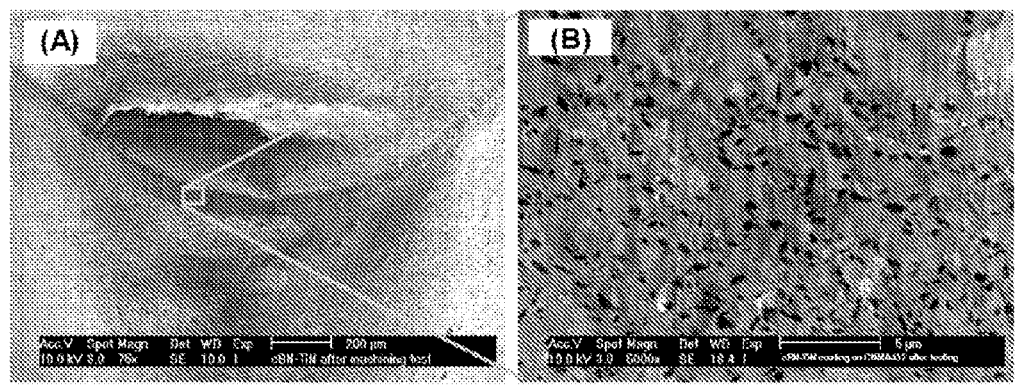
FIG. 4 is a combination of two SEM micrographs, showing aperiodicity in a preferred embodiment of the present invention, section (B) of FIG. 4 being an enlargement of the identified portion of section (A) of FIG. 4.

Turning now to FIGS. 1 and 2, a preferred embodiment of the invention may now be described with particularity. Substrate 10 is presented with coating 12, which is applied in a process as will be described below according to a preferred embodiment. Substrate 10 may be formed of various materials, such as carbides, nitrides, carbonitrides, and metallic phases. Substrate 10 may also, in various embodiments, be formed of a boronitride coated with carbides, nitrides, carbonitrides, and metallic phases. The coating 12 includes an edge 14 with protrusions and troughs (valleys) in the size range of as little as a few nanometers up to 5 microns. As seen in the SEM photograph of FIG. 2, coating 12 results in a cratered surface at serrated edge 14, which is quite rough in comparison to the traditional polished surfaces typically employed on the cutting edge of cutting tools and cutting tool inserts used for the cutting of very hard, difficult-to-cut materials. Aperiodicity in the coating is shown in FIG. 4.

The particles are preferably applied to substrate 10 using a hybrid deposition process. In a first step, the process begins with an electrostatic spray coating (ESC) method. In ESC, particles are charged and sprayed across an electrostatic field towards a substrate in order to deposit the particles onto the substrate. ESC coating processes are generally described in U.S. Pat. No. 6,607,782 to Malshe et al., which is incorporated herein by reference. Although ESC is used in the preferred embodiment, alternative embodiments may employ other powder coating methods such as ultrasonic spray deposition (USD) or electrostatic spray deposition (ESD). This process is then followed by a second step using chemical vapor infiltration (CVI). CVI is a process for the deposition of one or more materials within an existing body of porous material matrices. It is a variation of chemical vapor deposition (CVD), which uses a similar process for the deposition of a material onto a surface. The preferred materials to be used in the first ESC coating step are nitrides and carbonitrides, especially cubic boron nitride (cBN). This material is well known as an effective abrasive. In the second infiltration step, the preferred materials are nitrides, carbides, and carbonitrides, especially titanium nitride, hafnium nitride, zirconia nitride, titanium carbide, hafnium carbide, titanium carbonitride, and hafnium carbonitride. This is followed in the preferred embodiment by a post-processing or sintering step, which may be performed by, for example, radiation (such as laser or infrared radiation) or microwave sintering.

As noted above, the dimensions in any direction of the protrusions and troughs are preferably about one to three microns in each dimension. The dimensions of the surface features at edge 14 may be varied by changing process parameters, such as electrical voltage and spray distance, and by varying the particle size of the powder materials used in depositing coating 12. The inventors have found that increasing the voltage will generally increase the linear dimensions of the surface features by a relatively slight amount. Likewise, increasing the spray distance will typically increase the linear dimensions of the surface features. The average size and shape of the powder particles deposited on substrate 10 to form coating 12 have been found to significantly impact the surface features at edge 14. It has been found that, given an otherwise similar process and similar average particle size, particles with irregular shapes produce surface features with higher dimensions than powder particles with a generally smooth or spherical shape. Furthermore, other factors such as chemistry, temperature, and deposition time for the CVI process contribute to the shape and dimensions of the surface features at edge 14. The preferred temperature is in the range of 850° C. to 1050° C., and the preferred duration is in the range of 600 to 2400 minutes. It has been found that all other parameters being unchanged, higher temperatures and longer durations produce protrusions on the surface that are more coarse.

This process as described herein results in an aperiodic, statistically random topography along cutting edge 14, the topography consisting of randomly distributed protrusions and troughs (valleys). The size of the protrusion and trough features at cutting edge 14 are believed to be due at least in part to the nature of the pre-synthesized crystals or powder particles. The pre-synthesized crystals or powder particles can be procured from industrial suppliers. The inventors believe that the pre-synthesized crystals serve as nucleation sites, which amplify the surface feature formation process. It may be noted that the aperiodicity may, in alternative embodiments, may be present in multiple scales or orders, that is, the aperiodicity may be seen across different scales of viewing, larger and smaller. In addition, the aperiodicity may in alternative embodiments may be present in one linear dimension, with periodicity appearing in another linear dimension. Periodicity and aperiodicity may be combined at different scales or orders, such that the serrations are aperiodic at one scale, and periodic at another.

Figure 3:
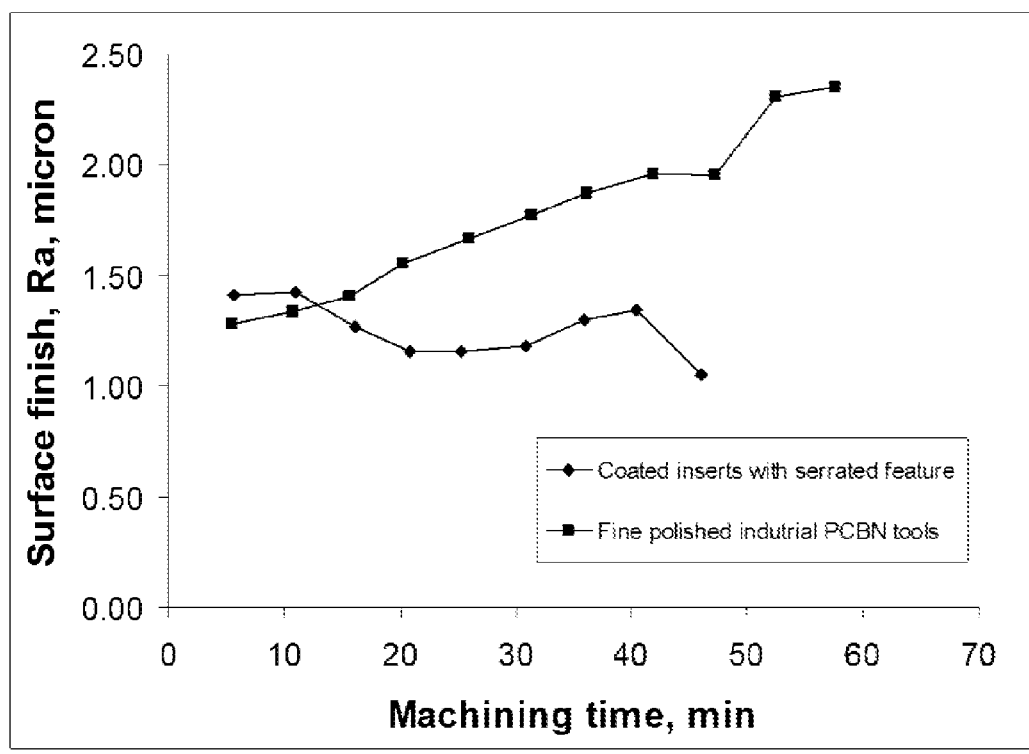
FIG. 3 is a graph comparing surface finish results on a workpiece cut with a traditional, finely polished edge polycrystalline cubic boron nitride (PCBN) insert with physical vapor deposition (PVD) coating, and a workpiece cut with an otherwise similar insert but employing an aperiodic serrated edge according to a preferred embodiment of the present invention.

In an example application of the deposition process according to a preferred embodiment, coated tools with the surface features as discussed above according to a preferred embodiment were tested in continuous turning of AISI 4340 hardened steel as the workpiece. This workpiece material had a hardness of about 52-54 HRC at a surface speed of 500 SFM, a feed rate of about 0.006 IPR, and a depth of cut of about 0.010", with standard cutting fluid employed. As a benchmark, an otherwise-similar, well-polished tool insert composed of a coated polycrystalline cubic boron nitride (PCBN) brazed tips was tested under identical conditions. As shown in FIG. 3, the results of this test demonstrate that the coated inserts with serrations at edge 14 produced according to the preferred embodiment of the present invention resulted in a cut surface with unexpectedly smoother surface finish than that produced using the well-polished cutting tool insert.

The inventors believe that the surprising, superior results achieved by the cutting tool with cutting edge serrations may result from the fact that the serrations provide an enhancement of the residence time of lubricant from cutting fluid on the face of the coating edge. The cutting fluid may thus be resident longer in the troughs at the serrated cutting edge, the troughs effectively forming microfluidic passages for the lubricant. The aperiodicity in the coating may make the lubricant remain on the work surface longer, thereby improving performance. In addition, the inventors believe that the serrations may have an influence on the microstresses placed at the point of contact with the workpiece with the coating edge due to multiple-point contact instead of full surface contact. Therefore, it is believed that at the same contact pressure, the friction at the interface due to sliding (i.e., relative movement) is marginally reduced. The effect may lead to a partitioning of heat produced at the contact point between the coating edge and the workpiece, and may result in a reduction of drag force between the cutting tool edge and the workpiece.

As used herein, "comprising" is synonymous with "including," "containing," or "characterized by," and is inclusive or open-ended and does not exclude additional, unrecited elements or method steps. As used herein, "consisting of" excludes any element, step, or ingredients not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. Specifically, the term "cutting tool" includes cutting tool inserts and other parts that may be used as part of a cutting tool. The invention illustratively described herein suitably may be practiced in the absence of any element or elements, limitation or limitations which is not specifically disclosed herein.

When a Markush group or other grouping is used herein, all individual members of the group and all combinations and subcombinations possible of the group are intended to be individually included in the disclosure.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Thus, additional embodiments are within the scope of the invention and within the following claims.

In general the terms and phrases used herein have their art-recognized meaning, which can be found by reference to standard texts, journal references and contexts known to those skilled in the art. The preceding definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

The invention claimed is:

1. A cutting tool, comprising:
   a. a substrate, wherein the substrate comprises a material selected from the set consisting of carbides, nitrides, carbonitrides, polycrystalline cubic boron nitride (PCBN), PCBN tip-brazed material, cermets, and steels; and
   b. a coating on the substrate, wherein the coating comprises a first material selected from the set consisting of carbides, nitrides, oxides, and carbon, wherein the first material is one of continuous and discontinuous, further wherein the coating is infiltrated with a second material selected from the set consisting of titanium nitride, hafnium nitride, zirconia nitride, titanium carbide, hafnium carbide, titanium carbonitride, and hafnium carbonitride, further wherein the coating comprises at least one cutting edge having a plurality of microfluidic channels, wherein the at least one cutting edge comprises an aperiodic plurality of serrations, the aperiodic plurality of serrations comprising a plurality of protrusions and a plurality of valleys, wherein at least a subset of the aperiodic plurality of serrations are aperiodic in a first linear dimension, and further wherein the subset of the plurality of serrations are aperiodic in at least one aperiodic scale.

2. The tool of claim 1, wherein the first linear dimension is no greater than 5 microns.

3. The tool of claim 2, wherein the first linear dimension in the range of 1 to 3 microns.

4. The tool of claim 3, wherein the at least one cutting edge comprises a plurality of periodic serrations that are periodic in a periodic scale that is one of larger or smaller than the aperiodic scale.

5. The tool of claim 3, wherein the at least one cutting edge comprises a plurality of periodic serrations that are periodic in a second linear dimension that is different from the first linear dimension.

6. The tool of claim 3, wherein the at least one cutting edge comprises a first plurality of aperiodic serrations and a second plurality of aperiodic serrations, wherein the first plurality of aperiodic serrations and the second plurality of aperiodic serrations are of a different scale.

7. The tool of claim 3, wherein the at least one cutting edge comprises a first plurality of aperiodic serrations and a second plurality of aperiodic serrations, wherein the first plurality of aperiodic serrations are aperiodic in a first linear dimension, and the second plurality of aperiodic serrations are linear in a second linear dimension.

8. The tool of claim 7, wherein at least one of the first and second plurality of aperiodic serrations are chipbreakers.

* * * * *